R. H. BREMER.
TREE PROTECTOR.
APPLICATION FILED JUNE 23, 1910.
989,325.
Patented Apr. 11, 1911.
2 SHEETS—SHEET 1.
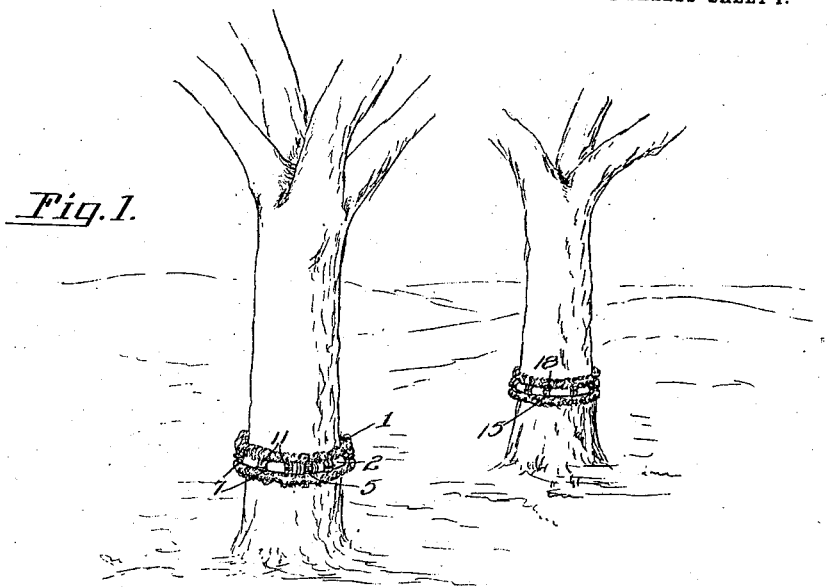
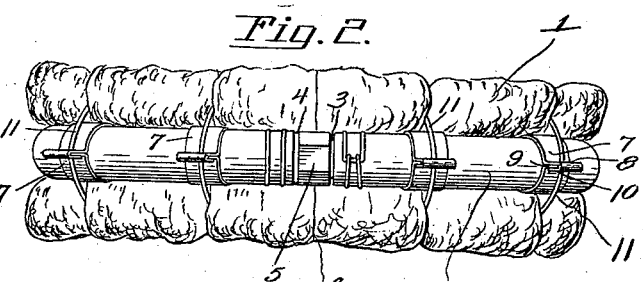
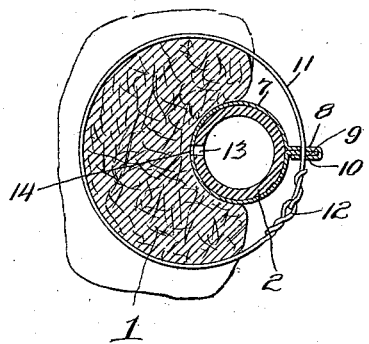
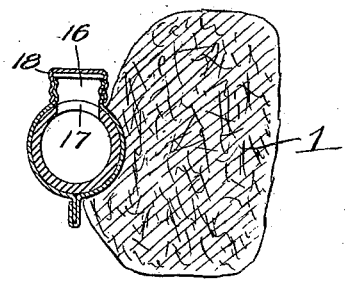
Witnesses
F. L. Gibson
James A. Koehl
Inventor
Russell H. Bremer.
By Victor J. Evans
Attorney

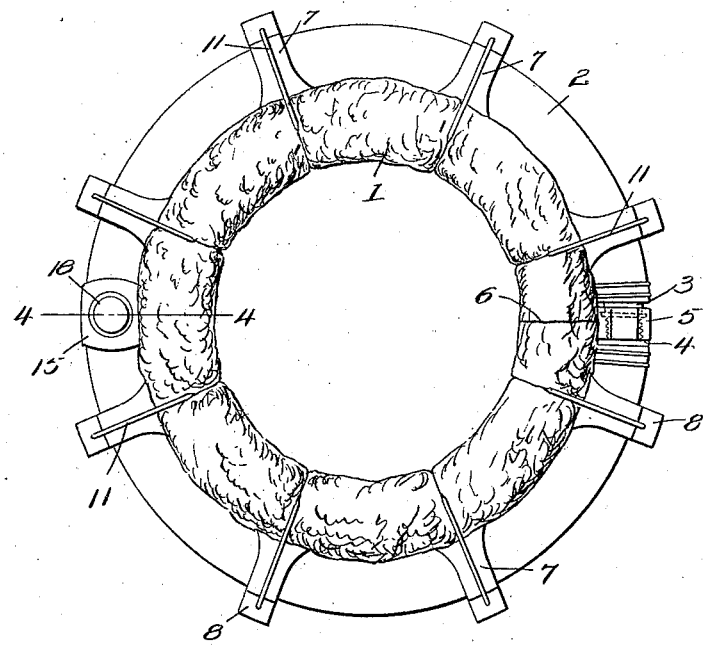
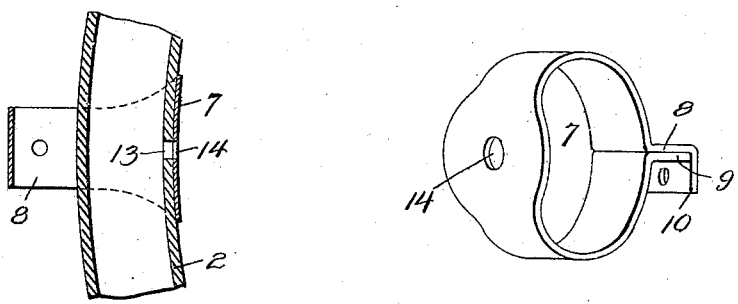

UNITED STATES PATENT OFFICE.

RUSSELL H. BREMER, OF READING, PENNSYLVANIA, ASSIGNOR OF ONE-FOURTH TO FREDERICK W. MAURER AND ONE-FOURTH TO JONATHAN KISTLER, OF LANSFORD, PENNSYLVANIA, AND ONE-FOURTH TO ODEN F. THIRY, OF READING, PENNSYLVANIA.

TREE-PROTECTOR.

989,325.

Specification of Letters Patent. Patented Apr. 11, 1911.

Application filed June 23, 1910. Serial No. 568,517.

*To all whom it may concern:*

Be it known that I, RUSSELL H. BREMER, a citizen of the United States of America, residing at Reading, in the county of Berks and State of Pennsylvania, have invented new and useful Improvements in Tree-Protectors, of which the following is a specification.

This invention relates to tree protectors, and it has for an object to provide an absorbent member to be wrapped about the trunk of a tree and a reservoir for the reception of a poisonous liquid insecticide, the reservoir being constructed to permit escape of the insecticide onto the absorbent member.

Another object of the invention is to provide a reservoir constructed so that it can be conveniently changed to enable it to fit trees of different sizes.

In the drawings, forming a portion of this specification and in which like numerals of reference indicate similar parts in the several views:—Figure 1 is a detail perspective view illustrating the application of the invention. Fig. 2 is a side view of the protector. Fig. 3 is a detail transverse section through the protector taken on a line with one of the clamps. Fig. 4 is a similar section taken on the line 4—4 of Fig. 5. Fig. 5 is a plan view of the protector. Fig. 6 is a detail section through a portion of the reservoir and through a portion of one of the clamps. Fig. 7 is a detail perspective view of one of the clamps.

My improved tree protector consists preferably of a piece of absorbent material 1 which is formed to fit around the trunk of a tree, as shown in Fig. 1 of the drawings. The absorbent material is surrounded by a reservoir 2 which is preferably of a flexible construction so as to permit the protector to readily conform with the shape of that portion of the tree to which it is applied and to cause the absorbent material to lie in close contact with the trunk of the tree. The reservoir consists of a rubber hose in which is fitted at one end an exteriorly threaded nipple 3. The opposite end of the hose has fitted thereto a companion member 4 on which the interiorly threaded coupling sleeve 5 is rotatably mounted. The coupling sleeve may be adjusted on the nipple 3 to cause the protector to snugly fit around the trunk of the tree. The coupling sleeve 5 is arranged in line with the split portion 6 of the absorbent band-like member 1. This construction is such as to facilitate the application of the protector to or its removal from the tree as the occasion may demand. By providing the sleeve 5 and the connections 3 and 4 it will be seen that the reservoir may be conveniently changed to adapt the use of the protector on trees of various sizes.

Apertured clamping bands 7 are arranged at suitable intervals about the reservoir. Each band consists of a split member having end flanges 8 and 9. The flange 8 is relatively long and its terminal 10 is bent into clamping engagement with the flange 9 so as to hold the clamping band operatively applied to the reservoir. The flanges 8 and 9 and the extension 10 are formed to provide alining apertures through which the flexible retaining ring 11 extends. The ring 11 is preferably formed of wire and it extends around the absorbent material to hold it confined to the reservoir. The terminals of the ring 11 are bent into locking engagement, as shown at 12. The reservoir is provided at suitable intervals with apertures such as those shown at 13 in Fig. 3 of the drawings. The clamping bands 7 have their apertures 14 disposed innermost and arranged in line with the apertures 13 so that the liquid insecticide from the reservoir can be discharged directly onto the absorbent material. A member 15 is supported by the reservoir and it is formed to provide an exteriorly threaded neck 16 which is located in line with the filling opening 17 of the reservoir. A removable cap 18 is fitted to the neck 16 so as to close the opening 17 of the reservoir when desired. The cap 18 may be removed at the will of the operator to vent the reservoir and to permit a perfect separation of the liquid insecticide onto the absorbent material.

The protector as herein described and illustrated is of an extremely simple construction and its application to the tree will guard it against destruction by vermin. It may be fitted conveniently to the tree and its flexibility and slight elasticity will permit it to conform in contour with that portion of the trunk of the tree to which it is applied.

I claim:—

1. A tree protector comprising an absorbent member, a flexible reservoir surrounding the member and having adjacent end portions arranged in opposing relation, and a coupling member connecting the said end portions of the reservoir with each other.

2. A tree protector comprising an absorbent member of ring form, a reservoir surrounding the member and formed with feed passages which open directly onto the member, bands extending around the reservoir, and retaining elements connecting the absorbent member with the bands to hold the reservoir applied to the absorbent member.

3. A tree protector comprising an absorbent member of ring form, a reservoir of tube form, a nipple at one end of the tube, a coupling sleeve adjustably mounted on the nipple, and a supporting element for the coupling sleeve operatively connected with the opposite end of the reservoir.

In testimony whereof I affix my signature in presence of two witnesses.

RUSSELL H. BREMER.

Witnesses:
CLARENCE C. DUNN,
JOHN SNIGIAK.

---

Copies of this patent may be obtained for five cents each, by addressing the "Commissioner of Patents, Washington, D. C."